United States Patent [19]

Kumar

[11] Patent Number: 5,223,545
[45] Date of Patent: Jun. 29, 1993

[54] POLYETHYLENE TEREPHTHALATE FOAMS WITH INTEGRAL CRYSTALLINE SKINS

[75] Inventor: Vipin Kumar, Seattle, Wash.

[73] Assignee: The Board of Regents of the University of Washington, Seattle, Wash.

[21] Appl. No.: 958,918

[22] Filed: Oct. 9, 1992

Related U.S. Application Data

[60] Division of Ser. No. 872,082, Apr. 21, 1992, Pat. No. 5,182.307, which is a continuation-in-part of Ser. No. 829,896, Feb. 3, 1992, abandoned, which is a continuation of Ser. No. 615,708, Nov. 21, 1992, abandoned.

[51] Int. Cl.$^5$ ............................................. C08J 9/34
[52] U.S. Cl. ................................. 521/51; 264/45.5; 521/97; 521/182
[58] Field of Search ................. 521/51, 97, 182; 264/45.5

[56] References Cited

U.S. PATENT DOCUMENTS

| | | |
|---|---|---|
| 3,277,029 | 10/1966 | Chadwick et al. ............... 260/2.5 |
| 3,290,261 | 12/1966 | Goldblum ......................... 260/2.5 |
| 4,097,421 | 6/1978 | Chang ............................... 260/2.5 |
| 4,429,060 | 1/1984 | Ide ..................................... 521/182 |
| 4,430,451 | 2/1984 | Young et al. ..................... 521/64 |
| 4,462,947 | 7/1984 | Huggard ........................... 521/182 |
| 4,473,665 | 9/1984 | Martini-Vredensky .......... 521/182 |
| 4,579,874 | 4/1986 | Krutchen et al. ................. 521/79 |
| 4,673,695 | 6/1987 | Aubert et al. .................... 521/64 |
| 4,761,256 | 8/1988 | Hardenbrook et al. ......... 264/45.5 |
| 4,772,640 | 9/1988 | Wolf et al. ........................ 521/90 |
| 4,832,881 | 5/1989 | Arnold, Jr. et al. ............. 264/29.7 |
| 4,904,702 | 2/1990 | Allen ................................. 521/88 |
| 4,981,631 | 1/1991 | Cheung et al. ................... 264/50 |
| 5,110,844 | 5/1992 | Hayashi et al. .................. 521/182 |
| 5,128,383 | 7/1992 | Amano et al. .................... 521/182 |
| 5,134,028 | 7/1992 | Hayashi et al. .................. 521/182 |

FOREIGN PATENT DOCUMENTS

0377323A2 11/1990 European Pat. Off. .
WO89/00918 2/1989 PCT Int'l Appl. .

OTHER PUBLICATIONS

Massachusetts Institute of Technology Disclosure, M.I.T. Case No. 4804, dated Aug. 5, 1988 by Vipin Kumar and Nam P. Suh.

Research Report to Kraft, Inc. entitled *Experiments in Microcellular Foaming of Polyethylene Terephthalate*, Laboratory for Manufacturing and Productivity, Massachusetts Institute of Technology, Project Number 70491, dated Aug. 1988 by Vipin Kumar and Nam P. Suh.

*Process Synthesis for Manufacturing Microcellular Thermoplastic Parts: A Case Study in Axiomatic Design*, by Vipin Kumar and N. P. Suh, Department of Mechanical Engineering and Laboratory for Manufacturing and Productivity, Massachusetts Institute of Technology, from Proceedings of ASME MI '88, Atlanta, Ga., Apr. 1988, vol. I, pp. 29–38.

Abstract for *Crystalline PET Foams: $CO_2$-Induced Changes in PET Morphology*, by Vipin Kumar and Osman S. Gebizlioglu, scheduled to be presented at Polymer-Processing Society Annual Meeting, Hamilton, Ontario, Apr. 21–24, 1991.

*Carbon Dioxide-Induced Crystallization in PET Foams* by Vipin Kumar and Osmund S. Gebizlioglu, presented at Society of Plastics Engineers Annual Meeting, Montreal, Ontario, May 5–10, 1991.

*A Model for Skin Thickness of Microcellular Plastics*, by Vipin Kumar and John E. Weller, presented at the Symposium on Heat and Mass Transfer in Solidification Processing, ASME Winter Annual Meeting, Atlanta, Ga., Dec. 1–6, 1991.

*Synthesis and Processing of Microcellular Plastics: A Review*, by Vipin Kumar, Department of Mechanical Engineering, University of Washington, presented at ASME Winter Annual Meeting, Atlanta, Ga., Dec. 1–6, 1991.

*Primary Examiner*—Morton Foelak
*Attorney, Agent, or Firm*—Christensen, O'Connor, Johnson & Kindness

[57] ABSTRACT

Polyethylene terephthalate composite structures having integral crystalline skins on a foam of polyethylene terephthalate are described. The structures exhibit enhanced physical properties compared to polyethylene terephthalate foams. The structures are produced by a method that crystallizes a portion of the polyethylene terephthalate before foaming the uncrystallized portions of the structure.

11 Claims, 7 Drawing Sheets

Fig. 5.
A1
CO₂ Sorption Time: 48.3 Hrs.

Fig. 6.
B1
CO₂ Sorption Time: 93.8 Hrs.

Fig. 7.
D1 - 191.9 Hrs.

Fig. 8.
E1 - 239.9 Hrs.

POLYETHYLENE TEREPHTHALATE FOAMS WITH INTEGRAL CRYSTALLINE SKINS

This invention was made with government support under grant number DDM 8909104 and grant number MSS 9114840 awarded by the National Science Foundation. The government has certain rights in the invention.

CROSS-REFERENCE TO RELATED APPLICATIONS

This is a divisional of the prior application Ser. No. 07/872,082, filed Apr. 21, 1992, now U.S. Pat. No. 5,182,307 which in turn is a continuation in part of application Ser. No. 07/829,896, filed on Feb. 3, 1992, now abandoned which in turn is a continuation of application Ser. No. 07/615,708, filed on Nov. 21, 1992, now abandoned, the benefit of the filing dates of which are hereby claimed under 35 U.S.C. §120. The disclosures of the prior applications are incorporated herein by reference.

FIELD OF THE INVENTION

The present invention relates to polyethylene terephthalate foams, and more specifically to polyethylene terephthalate foams with integral crystalline skins and methods for producing such materials.

BACKGROUND OF THE INVENTION

It is known that polystyrene can be foamed with nitrogen in a two stage process. In the first stage, polystyrene at room temperature is exposed to nitrogen gas in a pressurized mold. After a predetermined period of time, the polystyrene which has absorbed nitrogen gas is removed from the mold. In the second stage, the polystyrene is foamed at a temperature above its glass transition temperature. This microcellular process for foaming polystyrene is described in U.S. Pat. No. 4,473,665. A similar process using carbon dioxide as the nucleating gas has been used to foam polyethylene terephthalate (PET). The resulting PET foams are not microcellular, i.e., having cells in the 2 to 25 micrometer range as defined in U.S. Pat. No. 4,473,665. The PET foams produced had much larger cells, with diameters on the order of 100 to 300 micrometers. With respect to foaming polyethylene terephthalate, it was reported that the high solubility of carbon dioxide in polyethylene terephthalate results in a plasticization of the polymer which results in a lowering of its glass transition temperature. It was also reported that the plasticizing was believed to assist the crystallization process during the foaming process.

The composite foam structure produced by the method of the present invention is light weight, yet stronger than previous polyethylene terephthalate foams. The material can be used in applications where the strength or stiffness of the foams is inadequate.

SUMMARY OF THE INVENTION

The present invention is a polyethylene terephthalate foam that includes an integral crystalline skin which adds rigidity and strength to the foam. The crystalline skin is formed with the foam in such a manner that the foam and skin are integral elements. The crystalline skin/foam composite structure formed in accordance with the present invention is provided by a process that takes advantage of the unexpected crystallization of polyethylene terephthalate at room temperature after extended exposure to carbon dioxide.

The composite polyethylene terephthalate structure is provided by a method that includes the steps of exposing the polyethylene terephthalate to carbon dioxide gas for a period of time effective to induce crystallization at the surface of the polyethylene terephthalate, the crystallized surface having a weight percent crystallinity of at least about 19 percent. Thereafter, cell growth in the portion of polyethylene terephthalate, that has not crystallized in initiated, followed by quenching of the cell growth. Since cell growth does not occur in the crystallized polyethylene terephthalate, and does occur in the uncrystallized polyethylene terephthalate, the resulting product comprises a composite structure that has a skin of crystallized polyethylene terephthalate over a foam of polyethylene terephthalate.

There are many potential applications for such skin/foam composites. For example, microwaveable polyethylene terephthalate trays that are lighter and yet stiffer can be produced from these foams. Other applications include floor tiles, bicycle helmets, and even boat shells. These materials will have applications wherever lighter weight and increased strength and stiffness offer an advantage. Especially promising is the area of aircraft interior components.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

While the preferred embodiment of the invention has been illustrated and described, it will be appreciated that various changes can be made therein without departing from the spirit and scope of the invention.

Polyethylene terephthalate is a thermoplastic polyester formed from ethylene glycol by direct esterification or by catalyzed ester exchange between ethylene glycol and dimethyl terephthalate. It is commercially available as an oriented film or fiber. Polyethylene terephthalate has a melting point of 256° C. and a density of 1.38 grams per cubic centimeter. Polyethylene terephthalate has good electrical resistance and low moisture absorption, and also resists combustion and is self-extinguishing. Present day uses include blending with cotton for wash and wear fabrics, blending with wool for worsted wools and suitings, packaging films, recording tapes, and soft drink bottles. Polyethylene terephthalate is available from a number of commercial sources, including the Eastman Kodak Company and the Kraft Corporation.

In accordance with the present invention, the process for producing a composite structure of polyethylene terephthalate that comprises a polyethylene terephthalate foam and an integral layer of crystallized polyethylene terephthalate includes the step of exposing the polyethylene terephthalate to carbon dioxide gas for a period of time effective to induce crystallization at the surface of the polyethylene terephthalate. The crystalized surface exhibits a weight percent crystallinity of at least about 19 percent. Thereafter, cell growth is initiated in the portion of the polyethylene terephthalate that has not crystallized. After the cell growth has progressed sufficiently, it is quenched. The resulting product is a polyethylene terephthalate foam with an integral skin of crystallized polyethylene terephthalate. Properties of the composite material are described below in more detail.

An unexpected crystallization of polyethylene terephthalate at its surface occurs when it is exposed to carbon dioxide at room temperature over extended periods of time, generally longer than the time needed to produce polyethylene terephthalate foams. In order to produce a crystalline feature on a polyethylene terephthalate foam in accordance with the present invention, applicant has found that the surface of the polyethylene terephthalate that has crystallized preferably exhibits a weight percent crystallinity of at least about 19 percent. Where weight percent crystallinity of the surface of the polyethylene terephthalate exposed to carbon dioxide is less than about 19 percent, subsequent foaming results in a fully foamed article without an observable crystalline skin. When the weight percent crystallinity is about 19 percent or greater, foaming of the article results in an observable skin of crystalline polyethylene terephthalate. For example, sample D1 which had a weight percent crystallinity of about 19.3 percent, when foamed in a glycerin bath at 85° C. for 30 seconds results in a foam/skin composite having a crystalline skin about 25 micrometers thick. When the exposure time to carbon dioxide is increased, the weight percent crystallinity increases and the resulting foamed products have crystalline skins of increasing thickness.

Exposure of the polyethylene terephthalate to carbon dioxide may be carried out at pressures in the range of 40 to 60 atmospheres. One way of accomplishing the exposure is to place the polyethylene terephthalate in a mold pressurized with carbon dioxide gas.

The particular pressure at which the exposure of the polyethylene terephthalate to carbon dioxide is carried out can vary depending upon the other process parameters, such as temperature and length of exposure time. The specific pressure within the range given above is not particularly critical provided that the desired crystallization as described above is achieved. Applicant has observed that pressures in the range of 40 to 60 atmospheres will achieve crystallization at the surface of polyethylene terephthalate at room temperature when the exposure times are at least 190 hours, for example, on the order of 190 to 350 hours. It should be understood that pressures that are higher or lower than the recited range may be used in combination with shorter or longer exposure times, or at temperatures other than room temperature, provided the desired crystallization is achieved. As used herein, the phrase "room temperature" means about 21° C.

As the length of time that polyethylene terephthalate is exposed to carbon dioxide gas increases, so does the degree of crystallization. For example, a 1 cm $\times$ 1 cm $\times$ 1.5 mm sample of polyethylene terephthalate exposed to carbon dioxide gas for 240 hours at 50 atm exhibits a crystallized layer about 200 micrometers thick. An identical sample that is exposed to carbon dioxide gas at the same pressure for 192 hours exhibits a crystalline layer that is about 25 micrometers thick.

It has been observed that the crystallization generally proceeds inward from the surface of polyethylene terephthalate. At room temperature, the rate at which the crystallization proceeds is about 1 millimeter per 100 hours of exposure to carbon dioxide. The crystallization of polyethylene terephthalate results in a change in the transparency of a sheet of the polymer from clear to translucent, and then to opaque. The inward progression of the crystallization is evidenced by the change in transparency of the polymer occurring at the edges of the sheet. As the exposure time increases, the progression of the opaqueness towards the interior of the sheet increases.

Once crystallization at the surface of a polyethylene terephthalate is achieved, the uncrystallized portion can be foamed. Foaming is achieved by initiating cell growth in the uncrystallized polyethylene terephthalate which has absorbed a sufficient amount of carbon dioxide gas to foam. Foaming is accomplished by heating the polyethylene terephthalate to a temperature that is greater than the glass transition temperature of the uncrystallized polyethylene terephthalate. For the embodiment described herein, a suitable foaming temperature is in the range of about 70° to 120° C. One way of heating the polyethylene terephthalate is to immerse it in a glycerin bath. The length of time needed to foam the polyethylene terephthalate depends upon the temperatures at which it is heated. Generally, the lower the temperature, the longer the period of time needed to complete the foaming. For example, the 1 cm $\times$ 1 cm $\times$ 1.5 mm samples described above can be foamed by immersion in a 85° C. glycerin bath for 30 seconds.

When the desired degree of foaming is achieved, the foaming can be stopped by cooling the article. Cooling can be achieved by immersing the article in a quenching bath.

Figure 1:
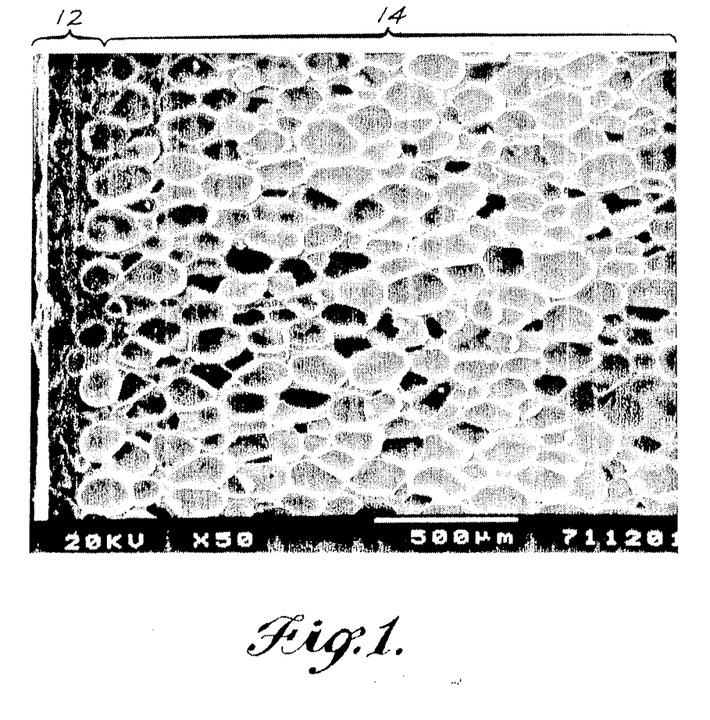
FIG. 1 is a scanning electron micrograph of a polyethylene terephthalate foam with an integral crystalline skin formed in accordance with the present invention.

The resulting composite skin/foam structure of polyethylene terephthalate includes a skin of crystalline polyethylene terephthalate and a polyethylene terephthalate foam. The crystalline skin is an integral part of the foam portion of the composite structure. By "integral" is meant that the crystalline skin and foam are formed from the same piece of polyethylene terephthalate. FIG. 1 is a scanning electron micrograph of a composite structure of polyethylene terephthalate that includes a crystalline skin 12 and a foamed portion 14. Foam portion 14 includes bubbles or closed cells. Crystalline skin 12 is the portion that is substantially free of bubbles or closed cells. Closed cells are absent from the crystalline skin because, in accordance with the method of the present invention, the crystalline skin is formed at the surface of the polyethylene terephthalate before the uncrystallized portion of the polyethylene terephthalate is foamed. Once the surface of the polyethylene terephthalate is crystallized as described above, the rigidity of the polymer prevents it from foaming and forming cells. In the illustrated embodiment, the cells in the polyethylene terephthalate foam are on the order of 100 micrometers in diameter.

In the embodiment illustrated in FIG. 1, the crystalline skin is about 50–100 micrometers thick. As described above, the thickness of the crystalline skin can be controlled by the length of time that the polyethylene terephthalate is exposed to the carbon dioxide gas. Composite structures of polyethylene terephthalate having crystalline skin thicknesses in the range of 25–250 micrometers and foam portions having cells with diameters in the range of about 100 to 400 micrometers have been produced in accordance with the present invention. These composite structures were produced from polyethylene terephthalate articles whose surfaces had a weight percent crystallinity of at least about 19 percent after carbon dioxide sorption. Overall, composites formed in accordance with the present invention have a density that ranges from about 0.35 to 1.0 grams/cubic centimeter have been produced. By using a higher foaming temperature composites having densities less than 0.35 grams/cubic centimeter can be produced. Similarly, composites having densities approaching the density of polyethylene terephthalate could be produced by crystallizing a larger fraction of the sample prior to foaming.

The polyethylene terephthalate composite structure formed in accordance with the present invention exhibits enhanced strength and stiffness properties compared to polyethylene terephthalate foams.

EXAMPLE 1

A 1.5 millimeter thick sheet of polyethylene terephthalate available from the Kraft Corporation made from a resin available under the name Kodapak 9921 from Eastman Kodak Company was placed in a mold and exposed to carbon dioxide gas at a pressure of 48 atm. Before being placed in the mold the sample was transparent. The temperature of the mold was 21° C. The exposure was continued for 210 hours. The sample was removed from the mold. The edges of the sample were opaque, indicating that the exposure to carbon dioxide at the above conditions had crystallized a portion of the polyethylene terephthalate. The center of the sample was translucent, indicating that the exposure to carbon dioxide under the conditions described above had resulted in the nucleation of cells within the portion of the sample that had not crystallized.

Cell growth in the sample was initiated by immersing the sample in a glycerin bath at a temperature of about 85° C. The sample was immersed for about 60 seconds. Cell growth was then quenched by immersing the sample in a bath of water at a temperature of about 21° C.

A scanning electron micrograph of a fracture surface of the sample is provided in FIG. 1.

EXAMPLE 2

Transparent polyethylene terephthalate sheets made from Kodapak 9921 resin, supplied by the Kraft Corporation, were used in the following experiment. Two samples measuring 1 cm × 1 cm × 1.5 mm were cut from the sheets and placed in a mold pressurized to about 48 atm with carbon dioxide gas. The samples were withdrawn every other day from the mold and weighed on a Mettler AE 240 balance, with a sensitivity capable of detecting 10 microgram changes in sample weight. After 48.3 hours, the two samples were withdrawn from the mold. One of the samples was immersed in a glycerin bath at 85° C. for 30 seconds. The other sample was kept at room temperature. Photographs of the foamed sample (A1) and the unfoamed sample (A2) were then taken.

Figure 2:
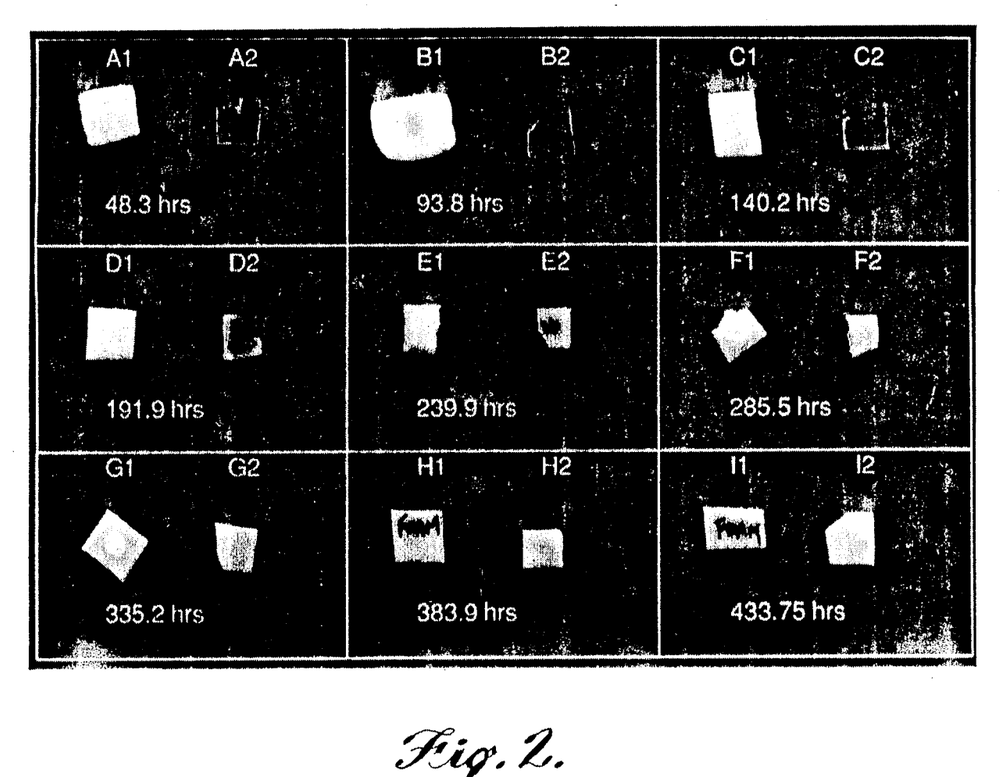
FIG. 2 is a photograph of 9 samples foamed in accordance with the present invention and 9 samples that were exposed to carbon dioxide gas in accordance with the present invention, but not foamed.

The above procedure was repeated for identical pairs of samples, with the exception that the length of time that the pairs were exposed to the carbon dioxide gas under pressure was increased to 93.8 hours, 140.2 hours, 191.9 hours, 239.9 hours, 285.5 hours, 335.2 hours, 383.9 hours, and 433.75 hours. Each pair of samples is shown in FIG. 2.

The foamed samples are numbered A1 through I1, while the corresponding unfoamed samples are numbered A2 through I2. The carbon dioxide sorption time for each sample is shown under each pair of samples in the photograph.

Figure 3:
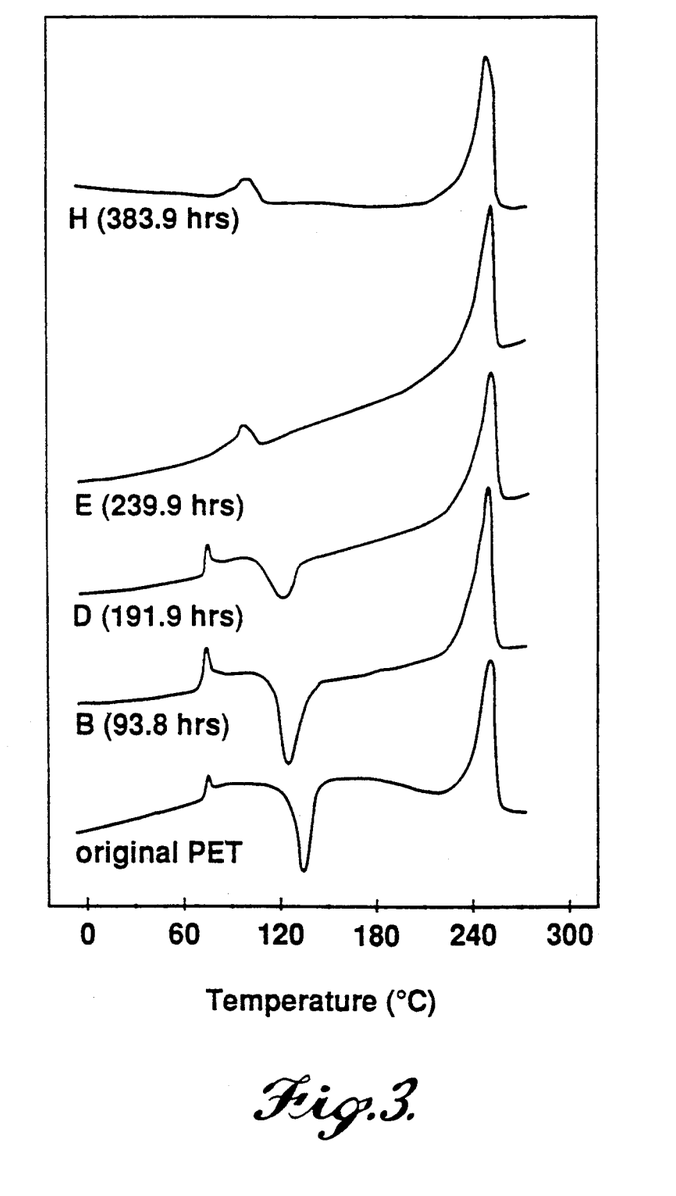
FIG. 3 is a graph illustrating a composite of differential scanning calorimetry thermograms for unfoamed polyethylene terephthalate as a function of increasing sorption times for carbon dioxide.

FIG. 3 is a composite of differential scanning calorimetry thermograms for the unfoamed samples B2, D2, E2, and H2 done using a Perkin Elmer DSC-4 differential scanning calorimeter with a heating/cooling rate of 10.0° C. per minute. In the composite thermogram, the original polyethylene terephthalate sample exhibits a crystallization peak (with an enthalpy of −6.1 calories per gram) at about 135° C. and a melting peak (with an enthalpy of 9.84 calories per gram) at 250° C. In the next thermogram labeled B (for sample B2), a small crystallization peak at 125° C. is observed and a melting peak at 249° C. A small enthalpy of crystallization for sample B suggests a higher weight fraction crystallinity at the start of the differential scanning calorimetry scan that the original polyethylene terephthalate sample. In the balance of the composite thermogram, the crystallization peak (and the enthalpy of crystallization) becomes progressively smaller as carbon dioxide gas exposure time increases. This indicates that carbon dioxide gas induces crystallization at room temperature and 48 atm pressure in the polyethylene terephthalate. It is noted that in the thermogram for sample E (exposed to carbon dioxide gas for 240 hours,) the crystallization peak has disappeared all together, suggesting that the maximum attainable crystallization has been achieved, and that no further crystallization takes place as the sample is further heated in the differential scanning calorimeter scan.

Figure 9:
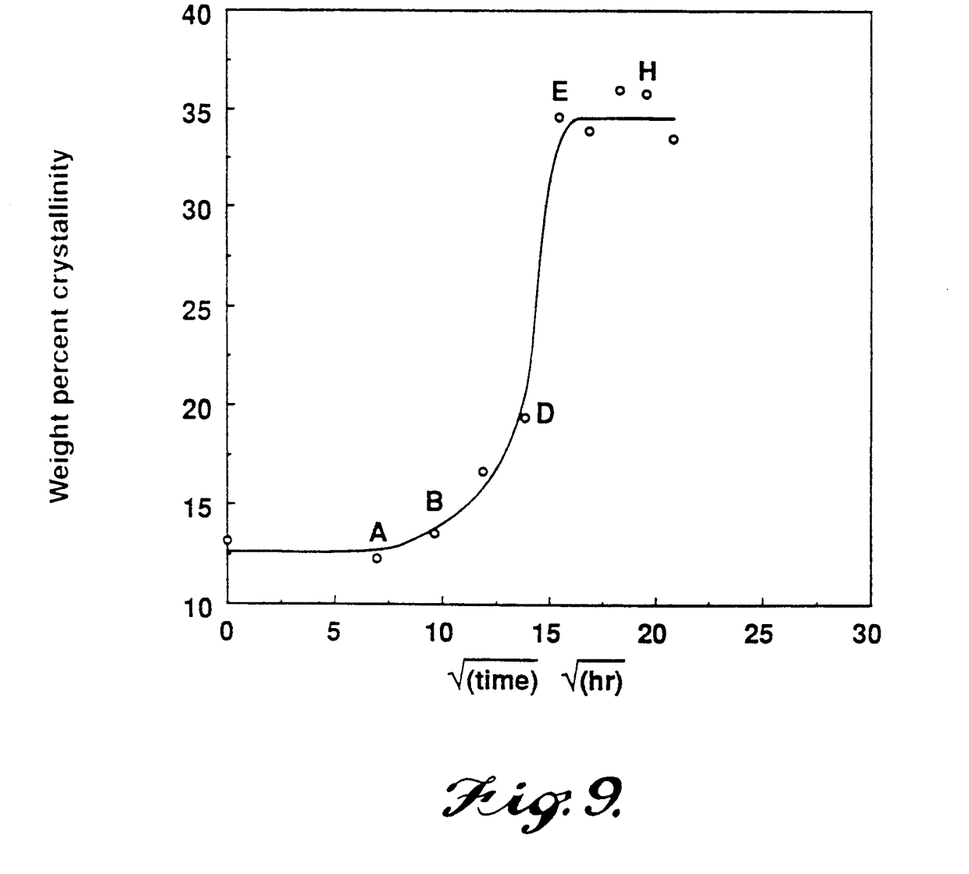
FIG. 9 is a graph of the weight percent crystallinity as a function of the square root of the carbon dioxide sorption time of unfoamed samples of polyethylene terephthalate.

FIG. 9 is a plot of weight percent crystallinity (Wc) of the crystallized surface of unfoamed polyethylene terephthalate samples A2–I2 as a function of the square root of the carbon dioxide sorption time. The weight percent crystallinity is determined by analyzing the differential scanning calorimetry thermograms shown in FIG. 3 to determine the enthalpy of fusion for the crystallized surface. Using a ratio of the enthalpy of fusion of the samples to the enthalpy of fusion for polyethylene terephthalate (i.e., $\Delta H_m$ 31.6 calories/gram) the weight percent crystallinity can be determined. The enthalpy of fusion was determined from the thermograms using known integration techniques contained in software provided with the Perkin Elmer calorimeter. The times and weight percent crystallinity values that are plotted in FIG. 9 are tabulated below in Table 1.

TABLE 1

| Sample | Weight % Crystallinity | Time (hr) |
|---|---|---|
| PET | 13.13 | 0 |
| A2 | 12.31 | 48.3 |
| B2 | 13.54 | 98.3 |
| C2 | 16.71 | 140.2 |
| D2 | 19.34 | 191.9 |
| E2 | 34.60 | 239.9 |
| F2 | 33.86 | 285.5 |
| G2 | 35.95 | 335.2 |
| H2 | 35.76 | 383.9 |
| I2 | 33.51 | 433.8 |

Applicant has observed that when the weight percent crystallinity is at least about 19 percent, a crystalline skin is provided when the sample is subsequently foamed.

Figure 10:
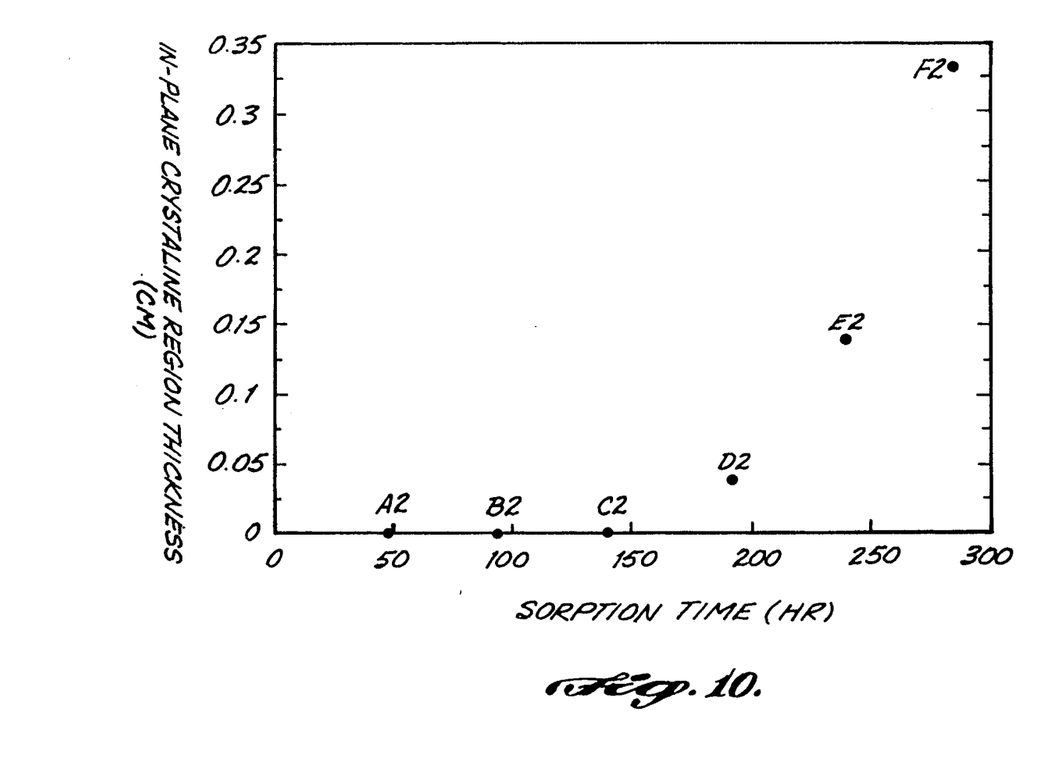
FIG. 10 is a graph of thickness of the in-plane crystallization observed in polyethylene terephthalate samples as a function of carbon dioxide sorption times.

FIG. 10 is a plot of the thickness of the in-plane crystallization of the samples A2–F2 as a function of carbon dioxide sorption time. "In-plane crystallization" refers to the crystallization that occurs in a plane substantially parallel to the surface of the sample. The thickness of the crystallized portion is observed by noting a change in portions of the sample from transparent to translucent. The first observable in-plane crystallization was noted in sample D2 which had a carbon dioxide sorption time of 192 hours and a weight percent crystallinity of about 19.3 percent.

From the photographs of FIG. 2, the following change in the appearance of the foamed and unfoamed samples is observed: in the unfoamed samples, a progressive change in the transparency of the samples with increasing carbon dioxide sorption time. Samples A2, B2 and C2 are as transparent as the original polyethylene sample. At about 192 hours of carbon dioxide sorption, sample D2 becomes more translucent. Also, the edges of sample D2 become opaque, while most of the interior of the sample remains translucent. With further exposure to carbon dioxide, the opaque edge continues to grow as shown in samples E2 and F2. Also, in samples E2 and F2, a small number of bubbles have begun to nucleate. Samples E2 and F2 were removed from the pressured mold after 240 and 286 hours, respectively, and then held at room temperature. After exposure to carbon dioxide gas for such long times, there appears to be sufficient plasticization of the polymer to allow bubbles to nucleate even at room temperature. The density of bubbles nucleated at room temperature is on the order of 100 to 1,000 bubbles per cubic centimeter. Samples G2, H2, and I2 are all opaque.

The corresponding set of foamed samples reveals the extent of crystallization in the interior of the samples. Samples H1 and I1 did not foam at all, which suggests that the samples have attained their maximum crystallization. In sample G1, a small central portion turned opaque due to foaming which indicates that this region did not yet undergo carbon dioxide-induced crystallization. After two days of sorption, a sufficient amount of carbon dioxide gas is absorbed by the polyethylene terephthalate for foaming to occur as shown by sample A1. The texture and final shape of the foamed samples changes with increasing carbon dioxide sorption time. Samples A1 and B1 are fully foamed and have rough textures. Sample B1 developed a considerable curvature as it foamed. Sample C1 is also fully foamed. Sample D1 exhibited a smooth skin and a little change of shape, except for an increase in thickness. Samples E1 through H1 show how the carbon dioxide gas-induced crystallization begins at the sample surface and progresses inwards. In sample E1, after 240 hours of carbon dioxide gas sorption, the edge of the sample has crystallized and most of the interior has foamed. Specimen E1 has a crystalline skin enveloping the foamed interior. In sample F1, after 286 hours of carbon dioxide gas sorption, the crystalline skin was thicker, and the crystalline edge region now covered nearly half of the sample area. In sample G1, after 335 hours of carbon dioxide gas sorption, most of the sample has crystallized and only a very small interior section in the center of the specimen has foamed. With further exposure to carbon dioxide gas, after 384 hours of carbon dioxide gas sorption, sample H1 did not foam at all. This suggests that after 384 hours, the polyethylene terephthalate had reached its maximum attainable crystallinity. Further exposure to carbon dioxide gas does not lead to any additional crystallization.

Figure 4:
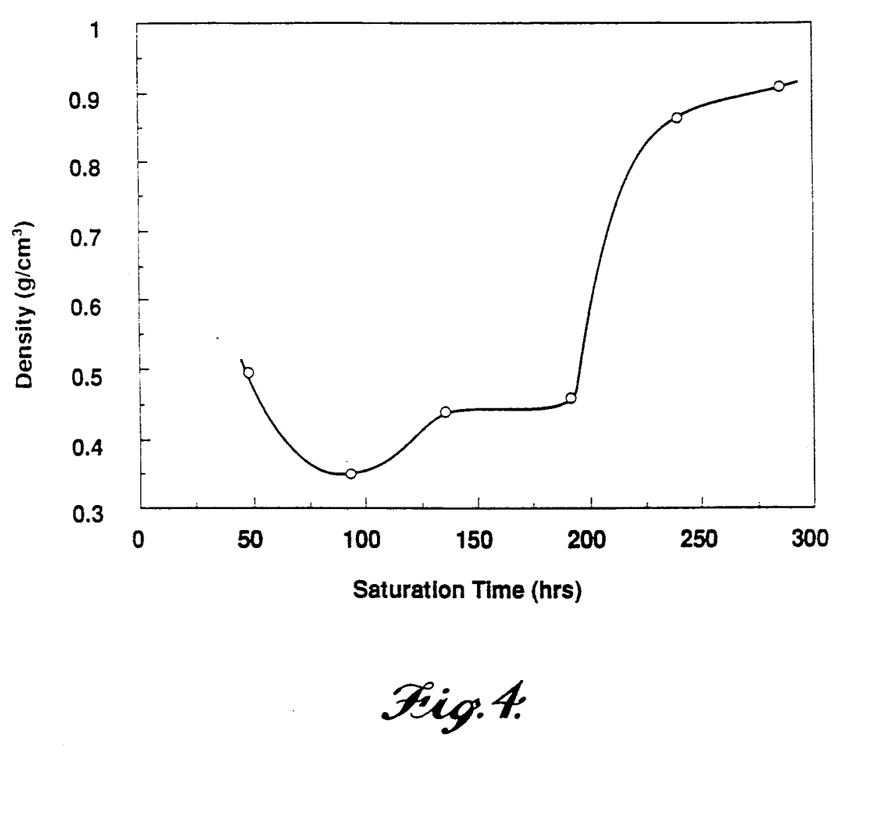
FIG. 4 is a graph of the density of a polyethylene terephthalate composite structure as a function of carbon dioxide gas exposure time.
Figure 5:
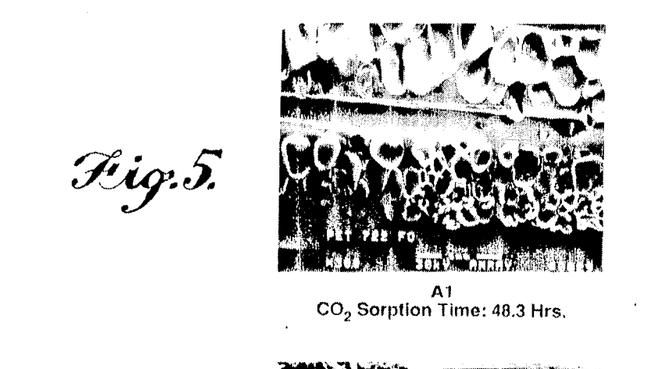
FIGS. 5-8 are scanning electron micrographs of polyethylene terephthalate composite structures of the present invention.
Figure 6:
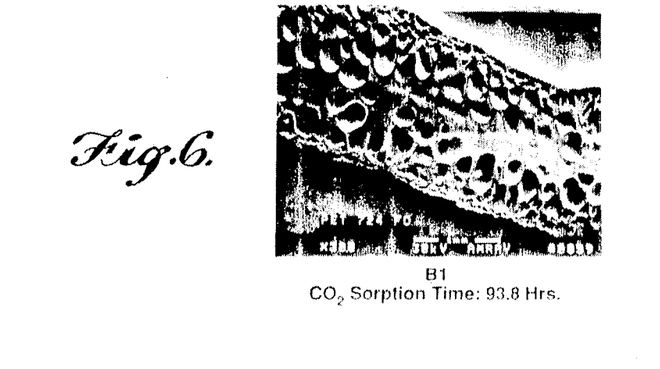
Figure 7:
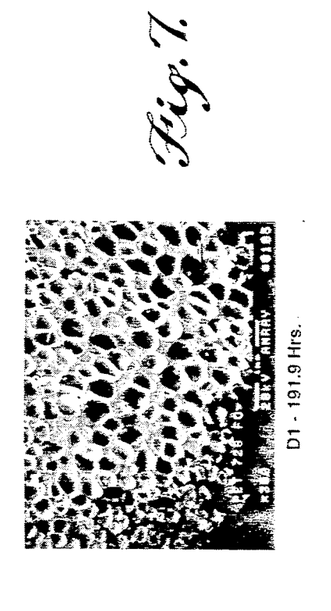
Figure 8:
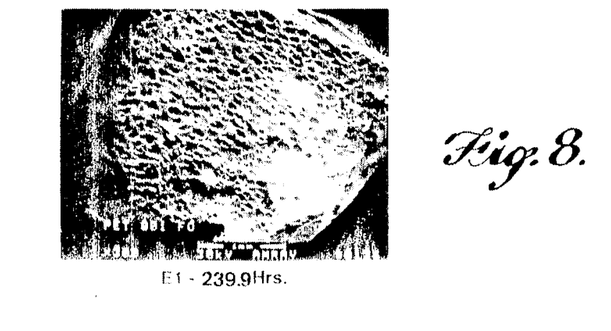

The density of the specimens is shown in FIG. 4. The lowest density, 0.35 grams per cubic centimeter, is attained after nearly 94 hours of carbon dioxide sorption (sample B1). Sample D1 has a density of nearly 0.45 grams per cubic centimeter. The density increases sharply in the samples with carbon dioxide exposures of 192 to 240 hours (samples D1 and E1). For example, sample E1 exhibited a density of 0.85 grams per cubic centimeter.

FIGS. 5–8 show a series of scanning electron micrographs of samples A1, B1, D1, and E1, respectively. The central region in sample A1 indicates a volume of polyethylene terephthalate with no bubbles. Sufficient carbon dioxide has not reached this portion of the sample for bubbles to nucleate. The unfoamed region in sample A1 is smaller than the unfoamed region in sample B1. In samples A1 and B1, the foamed region exhibits relatively large bubbles on the order of 100 to 400 micrometers in diameter. In sample D1, there appears to be homogeneous nucleation throughout the sample volume. The cell density for sample D1 is higher than samples A1 and B1, and the bubble distribution appears uniform. Bubble diameters in sample D1 range from 100 to 300 micrometers. In sample E1, a uniformly foamed interior region with 100 to 200 micrometer diameter bubbles and an unfoamed skin region of approximately 200 micrometers thick is observed. The thickness of the skin region in sample D1 is not clearly discernible; however, it is estimated that skin thickness after about 200 hours of carbon dioxide gas sorption is about 25 micrometers. It should be understood that while samples H1 and I1 did not foam, exposure of polyethylene terephthalate to carbon dioxide for periods of time in excess of 350 hours can still produce composite structures of a foam and a crystalline skin. For instance, articles of polyethylene terephthalate having larger dimensions than samples H1 and I1 would not necessarily be completely crystallized after 385 or 435 hours of exposure to carbon dioxide gas. Accordingly, the foam/skin composite structure could still be produced.

COMPARATIVE EXAMPLE

A sample of polyethylene terephthalate available from the Kraft Corporation made from a resin available under the name Kodapak 9921 from Eastman Kodak Company was saturated with a uniform concentration of carbon dioxide at 700 psi at room temperature. The equilibrium gas concentration was approximately 65 mg of carbon dioxide per gram of polymer. This concentration was reached after approximately 175 hours of sorption time. The sample was placed in a glycerin bath at 85° C. for 30 seconds. A foam with a void fraction of 0.54 was produced by the process. The resulting product was a foam of polyethylene terephthalate. No unfoamed crystallized portions were observed on the surface.

The embodiments of the invention in which an exclusive property or privilege is claimed are defined as follows:

1. A method for producing a crystalline feature on a polyethylene terephthalate foam, the method comprising the steps of:
   exposing polyethylene terephthalate to carbon dioxide gas for a period of time effective to induce crystallization at the surface of the polyethylene terephthalate, the crystallized surface having a weight percent crystallinity of at least about 19 percent;
   initiating cell growth in the portion of the polyethylene terephthalate that has not crystallized; and
   quenching the cell growth.

2. The method of claim 1, wherein the polyethylene terephthalate is exposed to the carbon dioxide gas for a period of time at least about 190 hours.

3. The method of claim 2, wherein the polyethylene terephthalate is exposed to the carbon dioxide gas for a period of time in the range of about 190 to about 350 hours.

4. The method of claim 1, wherein the polyethylene terephthalate is exposed to the carbon dioxide gas at a temperature in the range of about 20° to 30° C.

5. The method of claim 4, wherein the crystallization of the polyethylene terephthalate proceeds at a rate of about 1 millimeter per 100 hours of exposure to carbon dioxide gas at room temperature.

6. The method of claim 5, wherein the crystallization of the polyethylene terephthalate proceeds inward from the surface of the article.

7. The method of claim 1, wherein the polyethylene terephthalate is exposed to the carbon dioxide gas at a pressure in the range of about 40 to 60 atmospheres.

8. The method of claim 1, wherein initiating cell growth in the uncrystallized polyethylene terephthalate comprises heating the polyethylene terephthalate to a temperature sufficient to initiate the cell growth.

9. The method of claim 8, wherein initiating cell growth in the uncrystallized polyethylene terephthalate comprises heating the polyethylene terephthalate to a temperature above the glass transition temperature of the uncrystallized polyethylene terephthalate.

10. The method of claim 9, wherein the temperature sufficient to initiate cell growth in the uncrystallized polyethylene terephthalate is in the range of about 70° to 120° C.

11. The method of claim 1, wherein quenching of the cell growth in the uncrystallized polyethylene terephthalate further comprises cooling the polyethylene terephthalate.

* * * * *